United States Patent [19]

Vetter et al.

[11] Patent Number: 4,478,151

[45] Date of Patent: Oct. 23, 1984

[54] PRESSURE VESSEL PENETRATOR

[75] Inventors: Ronald F. Vetter; Howard W. Gerrish, Jr.; Lawrence F. Lesniak, all of Ridgecrest, Calif.

[73] Assignee: The United States of America as represented by the Secretary of the Navy, Washington, D.C.

[21] Appl. No.: 470,671

[22] Filed: Feb. 28, 1983

[51] Int. Cl.³ .............................................. F42B 41/00
[52] U.S. Cl. .................................... 102/481; 102/374; 102/293; 102/289; 102/291; 89/1 B; 60/223; 149/37; 149/114
[58] Field of Search ............... 102/289, 378, 291, 293, 102/374, 481; 89/1 B, 34; 149/21, 37, 114; 60/223

[56] References Cited

U.S. PATENT DOCUMENTS

| | | | |
|---|---|---|---|
| 3,297,503 | 1/1967 | Hoffman et al. | 149/37 X |
| 3,325,316 | 6/1967 | MacDonald | 149/37 X |
| 3,357,356 | 12/1967 | Bischoff | 102/378 |
| 3,649,390 | 3/1972 | Ahlert et al. | 149/37 |
| 3,695,951 | 10/1972 | Helms, Jr. et al. | 149/37 |
| 3,752,078 | 8/1973 | Stump | 89/1 B X |
| 3,754,496 | 8/1973 | Noel | 89/1 B X |
| 3,903,803 | 9/1975 | Losey | 89/1 B X |
| 4,208,226 | 6/1980 | Deardorff et al. | 149/37 |
| 4,330,346 | 5/1982 | Alm et al. | 149/114 X |
| 4,405,104 | 9/1983 | Charman et al. | 89/1 B X |
| 4,410,470 | 10/1983 | Sayles | 149/114 X |
| 4,411,199 | 10/1983 | Yates et al. | 102/481 |

Primary Examiner—Peter A. Nelson
Attorney, Agent, or Firm—Robert F. Beers; W. Thom Skeer

[57] ABSTRACT

Positive rocket motor pressure hull venting in the case of deck fires is provided by placement of thermite masses at spaced locations on the interior of the hull. Small cylindrical masses as well as strip formed masses are employed. The thermite mass includes a small amount of structurally formed aluminum as well as the conventional powdered aluminum.

18 Claims, 8 Drawing Figures

PRESSURE VESSEL PENETRATOR

BACKGROUND OF THE INVENTION

1. Field of the Invention:

This invention pertains to the field of ordnance. More particularly, the invention pertains to a safety mechanism to minimize accidents caused when handling ordnance on flight decks of aircraft carriers. In still greater particularity, the invention pertains to a construction which safely vents the gases from burning propellant ignited by fuel fires on the aircraft carrier deck. By way of further explanation, the invention pertains to a construction using exothermic compositions within the pressure hull of the rocket motor to perforate the hull or soften it by heating or melting in the event of a fuel fire.

2. Description of the Prior Art:

The prior art in the category of active energetic cookoff hazard reduction has primarily relied upon explosive causing case penetration or by thermal stresses set up by external configurations and coatings on the outside of the pressure hull. The explosive technique necessitates high explosives, sensor and trigger devices and detonators having their own hazards and costs and care in manufacture and attachment. Additionally, these devices add undesirable weight and volume and drag increases to the exterior of the ordnance. The inactive and insulative concepts function to delay ignition of the ordnance or explosive detonation thereof and depend on having the fire extinguished before a violent reaction occurs. Although satisfactory for their intended purposes, these prior art solutions are expensive and uncertain in their reduction of hazards.

SUMMARY OF THE INVENTION

The invention overcomes the disadvantages of the prior art by providing a positive venting or weakening of the pressure hull in the event of an external fuel fire such that, when the propellant grain of the ordnance ignites, the grain vents harmlessly through the weakened or open wall of the pressure hull. This venting of hot gases torches the hull open to prevent explosion of the propellant grain or movement of the ordnance due to the normal propelling forces. In the preferred embodiments of the invention a small charge of thermite or thermite-like material is placed at predetermined locations on the interior of the pressure hull. An igniter is intimately associated with these thermite charges and the entire assembly is covered with an insulator of the type conventionally used as a rocket motor liner. The locations of these masses of thermite material is chosen such that a high likelihood of exposure to fuel fires will be present regardless of the position of the rocket motor including such positions as might be altered by explosions or other damage on the flight deck environment.

STATEMENT OF THE OBJECTS OF THE INVENTION

Accordingly, it is an object of this invention as to provide a safe pressure hull penetrator for rocket propelled ordnance.

A further object of this invention is to provide an exothermic pressure hull penetrator for inclusion within a rocket motor.

A still further object of this invention is to provide a thermite mass and composition optimized for pressure hull penetration.

Other objects, advantages, and novel features of the invention will become apparent from the following detailed description of the invention when considered in conjunction with the accompanying claims and drawings wherein:

DESCRIPTION OF THE PREFERRED EMBODIMENT

Figure 1:
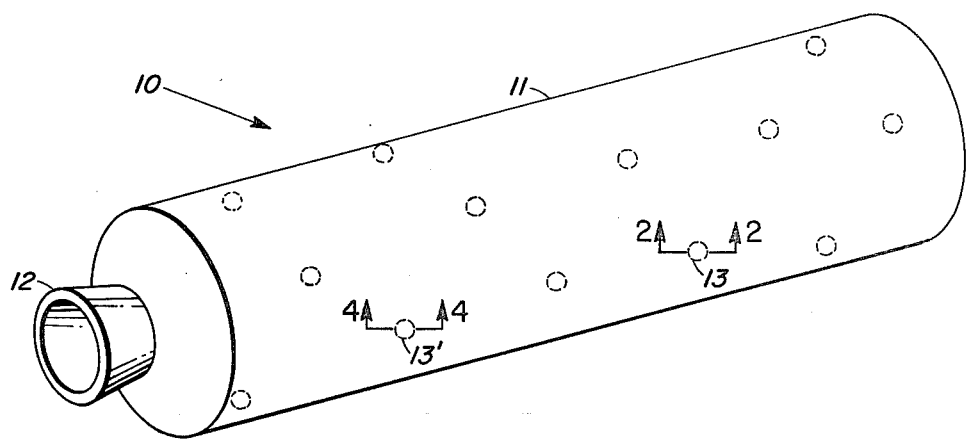
FIG. 1 is a perspective view of a rocket motor incorporating the invention.

Referring to FIG. 1, a rocket motor is indicated generally at 10. The rocket motor has a pressure hull 11 and a nozzle 12. A plurality of exothermic units 13 and 13' are placed within pressure hull 11 at locations which are predetermined to provide a maximum likelihood of exposure to ambient fuel fires regardless of the position of rocket motor 10. In the illustrated arrangement these units 13 and 13' are arranged to follow a spiral line of placement and spaced, one from the other, to insure a uniform angular coverage. The exact number and placements of units 13 and 13' are empirically determined in dependence upon the type of motor 10, the mounting of the motor 10 within the particular ordnance, not shown, and other geometric and physical considerations. These placements are made following good engineering practice with the objective being the insurance that at least one unit is exposed to a maximum heat transfer in the event of an external fire.

Figure 2:
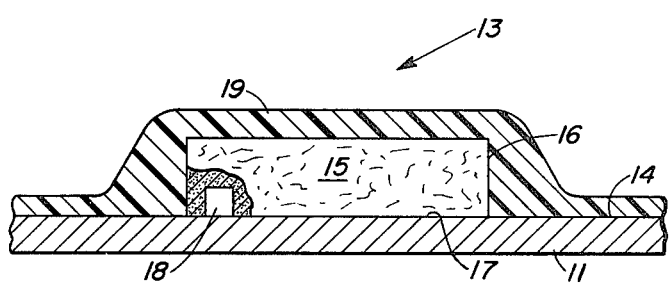
FIG. 2 is a sectional view taken along line 2—2 of FIG. 1.

Referring to FIG. 2, a sectional view taken along lines 2—2 of FIG. 1, it may be seen that unit 13 is mounted on the inner surface 14 of hull 11 such that it is contiguous therewith. Unit 13 includes a thermite mass 15, to be described in greater detail, having a cylindrical wall surface 16 and a base 17. Base 17 is configured to match the curvature present in hull 11. Thermite mass 15 has a small quanity of igniter compound 18 contained within a recess communicating with base surface 17 thereof. Igniter 18 serves as both a heat detector and igniter to initiate combustion of thermite mass 15. A variety of pyrotechnic materials may be used for igniter 18 and in developmental models a compound similar to, or identical with, the propellant grain material has proven satisfactory. Thermite mass 15 is held in contiguous contact with the surface 14 by means of an insulating layer 19 which surrounds and encapulates the upper and side surfaces of thermite mass 15. Insulating material 19 may be similar to or the same material as used in the liner of rocket motor 10. If desired, insulating material 19 may be simply a portion of the liner or rocket motor 10.

Figure 3:
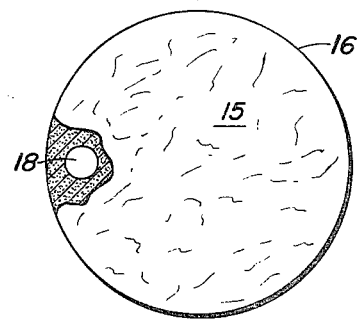
FIG. 3 is a top plan view of the exothermic mass illustrated in FIG. 2.

Referring to FIG. 3, the placement of the constituent parts of the thermite mass 15 is illustrated. As shown, igniter 18 occupies only a small portion of the area of thermite mass 15 and is placed closely adjacent to a cylindrical wall 16 thereof. This placement adjacent to the cylindrical wall 16 has been found to be desirable in promoting combustion thereof.

Figure 4:
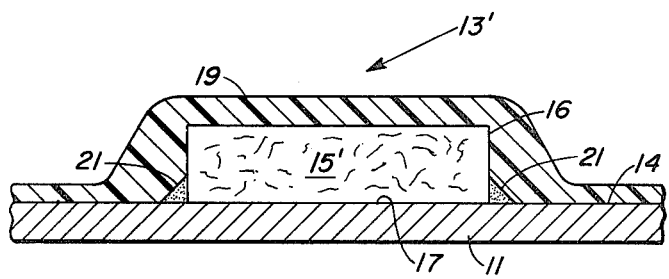
FIG. 4 is a sectional view taken along lines 4—4 of FIG. 1.

Referring to FIG. 4, an alternate arrangement for the practice of the invention is indicated by penetrator unit indicated at 13'. As shown, unit 13' comprises the same essential elements unit 13 with the exception that an igniter 21 is placed in a fillet which is adjacent cylindrical wall 16 and inner surface 14.

Figure 5:
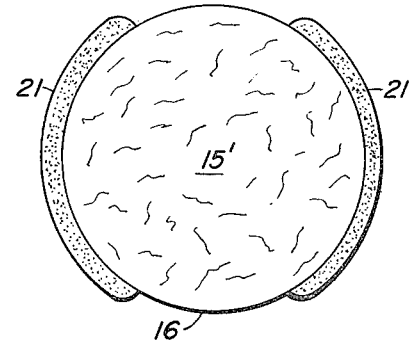
FIG. 5 is a top plan view of the exothermic device as shown in FIG. 4.

Referring to FIG. 5, this placement of igniter 21 is illustrated and it may be seen that igniter 21, in this configuration is, adjacent a major portion of cylindrical wall 16.

Considering the composition of thermite mass 15, it has been discovered that a special thermite mix comprising 75% $Fe_2O_3$ plus 20% of powered aluminum and 5% of structural aluminum is satisfactory. By structural aluminum is meant an aluminum having a form other than granular powder. This form frequently is in the form of small filaments or slivers. These fine filamentary pieces, or slivers, promote the bonding of the thermite mass into a pellet, as will be described, and are believed to benefit the thermite reaction.

Another type of structural aluminum is a porous solid made of aluminum into which the other materials are inserted by vibration. This matrix is then pressed, as described above, to the desired shape. One such porous aluminum material which has been used in developmental studies is made by Energy Research and Generation Inc. of Oakland, CA. and marketed under the trade name DUOCEL.

Of course, a selection of the structural aluminum is a somewhat empirical art and for given applications other structural forms than those previously described may be used, if desired.

In preparation of the embodiment illustrated at 13, FIGS. 2 and 3, 75 grams of preheated red iron oxide were combined with 20 grams of preheated H-3 aluminum powder. The resulting mixture was hand mixed until the aluminum was throughly mixed as indicated by no visible aluminum showing. To this mixture was added five grams of preheated aluminum slivers. The mixing was continued to insure a through mix. This mix was then placed within a mold which is attached to a hydraulic press and pressed to obtain a pellet which was stable to handle. A cork boring technique was then used to bore a quarter inch diameter cylindrical hole in the thermite mix and a pellet of rocket propellant was inserted within the bored hole and held in place with a very small quantity of cement applied to the cylindrical surfaces thereof being sure to leave the portion adjacent the base surface 17 uncoated. The compressed thermite pellet with the igniter embedded therein is placed against a portion of inner surface 14 of pressure hull 11 which has previously been cleaned with a suitable solvent such as acetone and allowed to dry. The pellet is then held in place with a layer of liner material 19 which extends over pellet 15 and extends out onto surface 14 to make a circular patch sufficient to hold pellet 15 in place. This patch is allowed cure for approximately 18 hours to insure mechanical integrity. The insulating liner material 19 may be any conventional type used in the rocket motor arts. One such material which has proven satisfactory comprises 36½ grams of R-45M, a registered trademark of Arco for hydroxy terminated polybutadiene and 3.47 grams of isophorone diisocyanate known in the trade as IPDI and marketed by Thorson Chemical Company, 60 grams of finely ground titanium dioxide ($TiO_2$), one-half a gram of CAB-O-SIL, a trade name of the Cabot Chemical Company and which is a finely powered silica, and one drop of a catalyst, marketed by M & T Chemicals Inc. of Pico Rivera, CA, known as T-12 which is a trade name for Dibutyltin dilaurate, a polymerization catalyst for polyurethane.

The molding of the thermite pellet 15 is a somewhat empirical art and a minimum of binders or adhering agents should be used. The difficulty with such agents is that in combustion the gaseous products from such binders distribute the molten iron and slag such that it interferes with the puncturing of hull 11.

Figure 6:
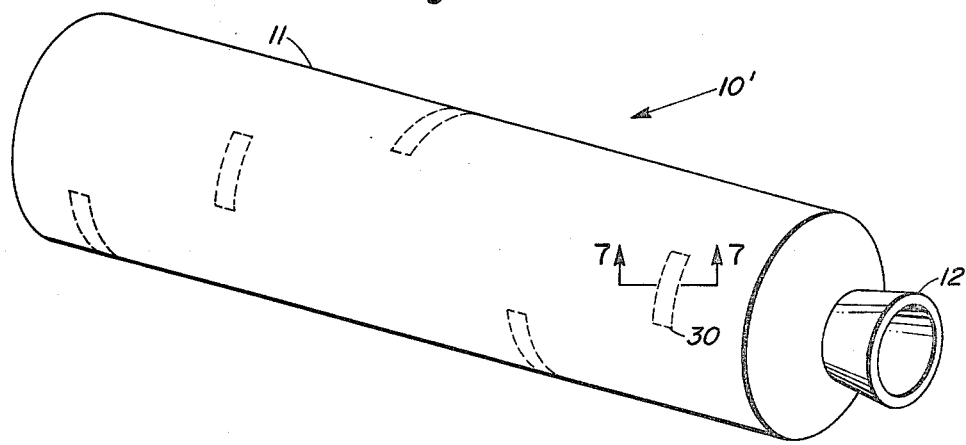
FIG. 6 is a perspective view of a rocket motor pressure hull according to the invention.

Referring to FIG. 6, a perspective view of another embodiment of the invention is illustrated. In this embodiment strips of thermite material indicated at 30 are placed on inner surface 14 of hull 11 in a manner similar to the placement of pellets 13 and 13' in FIG. 1. As may be seen in FIG. 7, a strip comprises a thermite mass 31 having a igniter compound 32 placed in a fillet alongside strip 31 on the base 33 which is held continguous to inner surface 14 by means of insulating liner 19.

Figure 7:
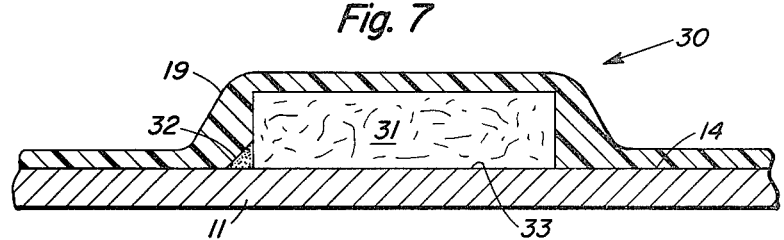
FIG. 7 is a sectional view taken along lines 7—7 of FIG. 6.
Figure 8:
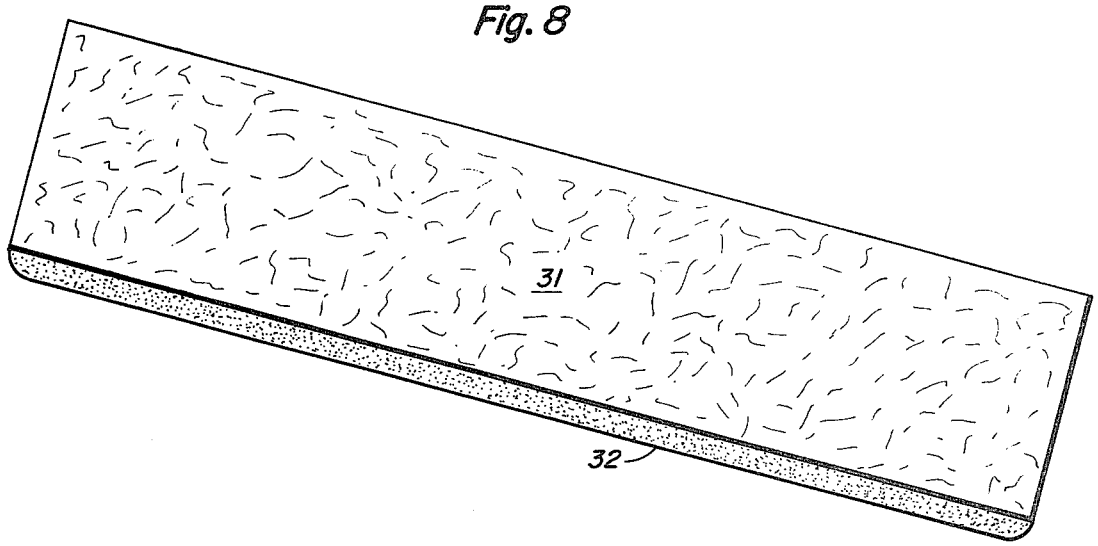
FIG. 8 is a top plan view of the device illustrated in FIG. 7.

Referring to FIG. 8, it may be seen that the major difference between the embodiment of FIGS. 6 and 7 from that of FIGS. 1 and 2 is the linear extent of the thermite mass. This strip arrangement permits a greater angular extent of the protection provided pressure hull 11 in comparison to the pellet configurations shown in FIGS. 1 and 2. In such an arrangement, strips covering up to approximately 120° of the circumference may be staggered as shown to provide total protection regardless of the position of motor 10'.

It is considered obvious that FIG. 1 shows the deployment of different igniter and pellet arrangements within the same pressure hull 11. Of course, one versed in the art may elect to use thermite masses of the same type within a given rocket motor and the different types illustrated should be considered for illustration purposes only.

In operation, the external fuel fires applied to pressure hull 11 causes the igniting material, 18, 21, or 32, to ignite and start the thermite reaction with pellet 15 or 15' or strip 31. This thermite reaction, as is well understood in the metallurgical arts, causes the oxidation of the aluminum and the reduction of the iron oxide to produce a quantity of molten iron which, because of the placement of the thermite mass against the inner surface of pressure hull 11, causes hull 11 to melt or be seriously thermally weakened. This weakening causes failure of pressure hull 11 in an area adjacent the propellant grain and permits the propellant grain to vent through this weakened or apertured area and vent in a relatively harmless fashion without explosive violence or propelling force.

The foregoing description taken together with the appended claims constitute a disclosure as to enable a person versed in the propulsion and pyrotechnic arts and having the benefit of the teachings contained therein to make and use the invention. Further, the structure herein described meets the aforestated objects of the invention, and generally constitute a meritorious advance in the art unobvious to such a worker not having the benefit of these teachings.

We claim:

1. A pressure hull penetrator for rocket motors comprising:

a rocket motor have a pressure hull with inner and outer surfaces;

a mass of thermite material having a predetermined shape to conform to a selected area of the inner surface of said rocket motor pressure hull;

an igniter compound in contact with said mass of thermite material and said inner surface; and a layer of insulating material overlying said mass of thermite material, said igniter mix, and adhering to said inner surface.

2. A pressure hull penetrator according to claim 1 wherein said mass of thermite material is of cylindrical shape.

3. A pressure hull penetrator according to claim 2 where said mass of thermite material has a cylindrical base adjacent the inner surface of said pressure hull.

4. A pressure hull penetrator according to claim 1 wherein said mass of thermite material is strip shaped.

5. A pressure hull penetrator according to claim 1 wherein said igniter mix is contained in a void within said mass of thermite material.

6. A pressure hull penetrator according to claim 3 wherein said igniter mix is contained within a void within said cylindrical base.

7. A pressure hull penetrator according to claim 1 wherein said igniter mix is located adjacent to said mass of thermite material in physical contact therewith and with said inner surface of said pressure hull.

8. A pressure hull penetrator according to claim 3 wherein said igniter mix is located adjacent the cylindrical base of said thermite mass in physical contact therewith and with said inner surface of said pressure hull.

9. A pressure hull penetrator according to claim 4 wherein said igniter mix is located adjacent said strip in contact therewith and with said inner surface of said pressure hull.

10. A pressure hull penetrator according to claim 1 wherein said thermite mix consists essentially of:
75% $Fe_2O_3$
20% of Al powder
5% of structurally formed Al.

11. A pressure hull penetrator according to claim 3 wherein said thermite mix consists essentially of:
75% $Fe_2O_3$
20% of Al powder
5% of structurally formed Al.

12. A pressure hull penetrator according to claim 4 wherein said thermite mix consists essentially of:
75% $Fe_2O_3$
20% of Al powder
5% of structurally formed Al.

13. A pressure hull penetrator for rocket motor comprising:

a rocket motor having a pressure hull having inner and outer surfaces;

a plurality of thermite measses positioned within said pressure hull at predetermined locations adjacent said inner surface thereof and in physical contact therewith;

a plurality of masses of igniter mix positioned in contact with the inner surface of said pressure hull and located in a predetermined pattern spaced about and in contact with said plurality of thermite masses; and a layer of insulating material bonded to said inner surface of said pressure hull and overlying said masses of igniter mix and said thermite mix.

14. A pressure hull penetrator according to claim 13 wherein said thermite max consists essentially of:
75% $Fe_2O_3$
20% of Al powder
5% of structurally formed Al.

15. A pressure hull penetrator according to claim 13 wherein said masses of thermite material is of cylindrical shape.

16. A pressure hull penetrator according to claim 14 wherein said masses of thermite material is of cylindrical shape.

17. A pressure hull penetrator according to claim 13 wherein said masses of thermite material is strip shaped.

18. A pressure hull penetrator according to claim 14 wherein said masses of thermite material is strip shaped.

* * * * *